United States Patent
Vandebeuque

(10) Patent No.: US 9,068,833 B2
(45) Date of Patent: Jun. 30, 2015

(54) GYROSCOPIC SENSOR AND METHOD FOR MANUFACTURING SUCH A SENSOR

(75) Inventor: Paul Vandebeuque, Paris (FR)

(73) Assignee: Sagem Defense Securite, Paris (FR)

( * ) Notice: Subject to any disclaimer, the term of this patent is extended or adjusted under 35 U.S.C. 154(b) by 441 days.

(21) Appl. No.: 13/509,536

(22) PCT Filed: Nov. 10, 2010

(86) PCT No.: PCT/EP2010/067215
§ 371 (c)(1),
(2), (4) Date: May 11, 2012

(87) PCT Pub. No.: WO2011/058058
PCT Pub. Date: May 19, 2011

(65) Prior Publication Data
US 2012/0227490 A1 Sep. 13, 2012

Related U.S. Application Data

(60) Provisional application No. 61/324,513, filed on Apr. 15, 2010.

(30) Foreign Application Priority Data

Nov. 12, 2009 (FR) ...................................... 09 05430

(51) Int. Cl.
*G01C 19/56* (2012.01)
*G01C 19/5691* (2012.01)
*G01C 19/5783* (2012.01)
*G01C 19/567* (2012.01)

(52) U.S. Cl.
CPC ........ *G01C 19/5691* (2013.01); *G01C 19/5783* (2013.01); *Y10T 29/49002* (2015.01); *G01C 19/56* (2013.01); *G01C 19/567* (2013.01)

(58) Field of Classification Search
CPC ........................ G01C 19/5691; G01C 19/5783
USPC .................... 73/493, 504.12, 504.13
See application file for complete search history.

(56) References Cited

U.S. PATENT DOCUMENTS

| 6,662,656 | B2 * | 12/2003 | Jeanroy | ...................... 73/504.13 |
| 7,267,003 | B2 * | 9/2007 | Hiraoka et al. | ................. 73/493 |
| 7,607,350 | B2 * | 10/2009 | Choi | ........................ 73/504.13 |
| 2005/0066724 | A1 | 3/2005 | Hiraoka et al. | |

FOREIGN PATENT DOCUMENTS

| FR | 2805039 A1 | 8/2001 |
| FR | 2859017 A1 | 2/2005 |

OTHER PUBLICATIONS

International Search Report and Written Opinion from PCT Application No. PCT/EP2010/067215, filed Nov. 10, 2010, mailed Jan. 10, 2011 (7 pgs.).

* cited by examiner

*Primary Examiner* — John Chapman, Jr.
(74) *Attorney, Agent, or Firm* — Patterson Thuente Pedersen, P.A.

(57) ABSTRACT

The invention relates to a gyroscopic sensor comprising a sensitive element designed to vibrate; an electrode carrier capable of carrying electrodes for exciting the sensitive element and electrodes for detecting the vibration of the sensitive element; and support rods designed to support the electrode carrier, characterized in that the support rods have at least one bulged end.

10 Claims, 1 Drawing Sheet

US 9,068,833 B2

GYROSCOPIC SENSOR AND METHOD FOR MANUFACTURING SUCH A SENSOR

PRIORITY CLAIM

The present application is a National Phase entry of PCT Application No. PCT/EP2010/067215, filed Nov. 10, 2010, which claims priority from French Application No. 09 05430, filed Nov. 12, 2009, and U.S. Patent Application No. 61/324,513, filed Apr. 15, 2010, the disclosures of which are hereby incorporated by reference herein in their entirety.

FIELD OF THE INVENTION

The present invention relates generally to gyroscopic sensors and more particularly to a method of manufacturing a sensor with better conducting rods.

BACKGROUND OF THE INVENTION

The present invention relates to a gyroscopic sensor comprising:
  a sensitive element designed to vibrate;
  an electrode carrier capable of carrying excitation electrodes for exciting the sensitive element and detection electrodes for detecting the vibration of the sensitive element; and
  support rods designed to support the electrode carrier.

Such a gyroscopic sensor is, for example, described in patent application FR 2 859 017. In this type of gyroscopic sensor, the conducting rods are generally formed by cylindrical piles fastened at one of their ends to the electrode carrier. However, the mechanical behaviour of this type of gyroscope is poor. The object of the invention is in particular to provide a gyroscopic sensor of better mechanical behaviour. For this purpose, one subject of the invention is a gyroscopic sensor in which the support rods have at least one bulged end.

SUMMARY OF THE INVENTION

According to particular embodiments, the gyroscopic sensor includes one or more of the following features:
  the bulged end rests on the electrode carrier;
  each support rod is all in one piece;
  each support rod is non intrusive;
  the electrode carrier comprises one first main face facing the sensitive element, an end face and a second main face opposite the first main face; the electrodes for exciting and the electrodes for detecting extend both over the first main face, over the end face and over the second main face; the bulged end being fastened to at least one part of the electrodes for exciting and the electrodes for detecting; said part of said electrodes extending over the second main face;
  the support rods have each at least one second bulged end which rests on the base;
  the support rods are mounted in spacer between the electrode carrier and the base;
  each bulged end comprises a flat end face;
  the bulged end is fastened to at least one electrode of an electrode carrier;
  the gyroscopic sensor includes a base which is capable of supporting the support rods and to which the bulged end is fastened;
  the electrode carrier has a first main face that faces the sensitive element and a second main face, opposite the first main face, the electrodes extending in a continuous manner over the first main face, the end face and the second main face of the electrode carrier.

For this purpose, another subject of the invention is a method for manufacturing a gyroscopic sensor comprising: a sensitive element designed to vibrate; an electrode carrier capable of carrying electrodes for exciting the sensitive element and electrodes for detecting the vibration of the sensitive element; and support rods designed to support the electrode carrier, the method according to the invention including a step of manufacturing support rods having at least one bulged end.

As a variant, the electrode carrier of the gyroscopic sensor comprises a first main face facing the sensitive element, an end face and a second main face opposite the first main face; and the method includes a step of depositing a portion of an electrode by sputtering on the first main face and on the end face through a slotted mask and a step of depositing a complementary portion of said electrode by sputtering on the second main face and on the end face through another slotted mask, the deposited films being superposed on the end face of the electrode carrier

BRIEF DESCRIPTION OF THE DRAWINGS

The invention will be better understood on reading the following description, given solely by way of example and with reference to the drawings in which.

Figure 1:
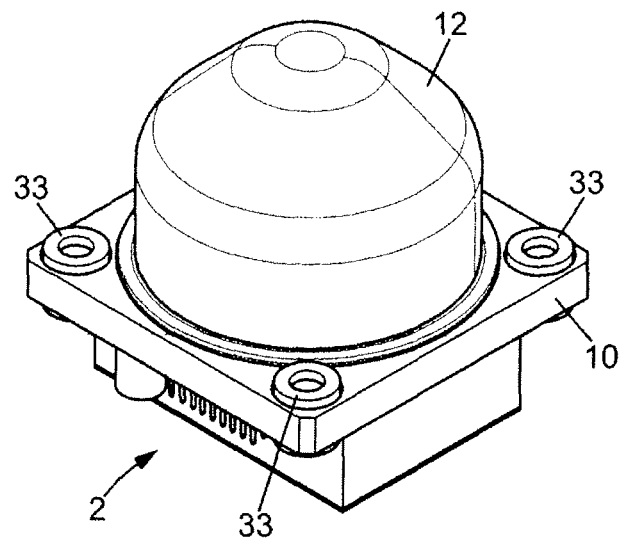
FIG. 1 is a perspective view of a gyroscopic sensor according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The invention is described in relation to a gyroscopic sensor having a resonator of bell shape or spherical cap shape. However, it could also be applied to any other type of gyroscopic sensor.

Figure 2:
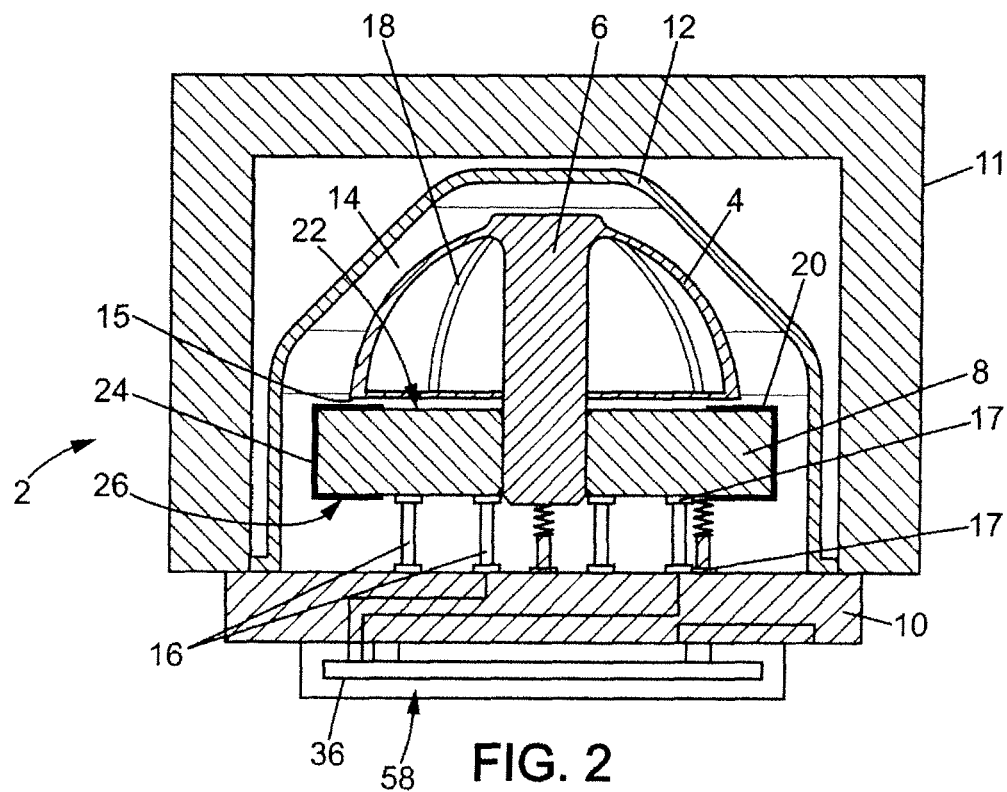
FIG. 2 is an axial sectional view of the gyroscopic sensor illustrated in FIG. 1.

In the rest of the description, the terms "upper" and "lower" are defined in relation to the gyroscopic sensor in a position as illustrated in FIGS. 1 and 2.

Referring to FIGS. 1 and 2, the gyroscopic sensor 2 according to the invention comprises:
  a sensitive element, called hereafter resonator 4, which may in particular be of hemispherical shape, as illustrated, and which has a shaft 6 for fastening;
  a part carrying the electrodes necessary for operating the resonator 4, called hereafter electrode carrier 8, in which the shaft 6 of the resonator 4 is anchored;
  a base 10 for fastening the gyroscopic sensor to a core 11; and
  a cover 12 fastened to the base 10 and forming with it a vacuum-sealed chamber 14 containing the electrode carrier 8 and the resonator 4.

Electrodes 20 for exciting the resonator 4 and for detecting the vibration of the resonator 4 are deposited on the electrode carrier 8. The electrodes 20 extend both over a main face 22 of the electrode carrier facing the resonator, over the end face 24 and over another main face 26, opposite the main face 22.

The electrode carrier 8 may have various configurations. It may be flat, with electrodes placed facing the end face 15 of the resonator 4, as illustrated in FIG. 2. It may also be hemispherical, with electrodes placed facing the internal face of the resonator. This configuration is not illustrated.

The electrode carrier 8 is supported by, for example, nine conducting support rods 16 that are supported by the base 10. The support rods 16 are thus mounted in spacer between the electrode carrier 8 and the base 10. The support rods have two bulged ends 17, forming "nail heads". The upper bulged ends 17 rest on the electrode carrier 8. The lower bulged ends 17 rest on the base 10.

Each support rod 16 is all in one piece. Each support rod 16 is non intrusive with respect to the electrode carrier 8 and the base 10.

Preferably, each bulged end 17 comprises a flat end face that has an area greater than the cross section of the support rods. This area is equal to about 1 to 3 square millimeters. This area may be modified depending on the desired mechanical behaviour.

The upper bulged ends 17 of the support rods 16 are fastened to at least one part of the electrodes 20 of the electrode carrier, for example by conducting adhesive or by soldering. In particular, the upper bulged ends 17 of the support rods 16 are fastened to the part of the electrodes 20 which extends over the second main face 26. Even if a thin conducting adhesive is taken back between the support rods 16 and the electrode carrier 8, the areas and the volumes of adhesive are small so that the outgassing in the chamber 14 is improved.

Advantageously, the flat end face ensures that the electrical and mechanical connection is coplanar with the lower face of the electrode carrier 8.

Advantageously, the end faces of the support rods 16 lie in the same parallel plane so that the length of the support rods may be better controlled. Since the vibration frequency of the support rods depends on the position where the support rods are fastened, the frequency plane of the gyroscopes is better controlled.

The base 10 is provided with four elements 33 for fastening the support 11, formed for example by tapped holes intended to receive fastening bolts.

The base 10 is produced by the high-temperature cofiring of ceramic layers. The lower bulged ends 17 of the support rods 16 are soldered to the base 10.

Advantageously, soldering the lower ends of the support rods 16 to the face 10 provides for better control of the vibration modes of the support rods.

According to a variant (not shown), the base 10 is for example made of metal. In this case, the base has bushings in which the support rods 16 are glass-sealed.

The gyroscopic sensor 2 further includes an electronic circuit 36 connected to the support rods 16 and a package 58 for protecting the electronic circuit 36, enabling the electronic circuit 36 to be maintained in a controlled atmosphere.

The invention also relates to a method for manufacturing such a gyroscopic sensor, which includes a step of manufacturing support rods 16 having at least one bulged end, preferably having a flat end face.

In particular, the method includes a step of depositing the electrodes 20 on the electrode carrier 8. This step is carried out by sputtering a portion of an electrode on the first main face 22 and on the end face 24 through a slotted mechanical mask and a step of depositing a portion of a complementary electrode by sputtering on the other main face 26 and on the end face 24 through another slotted mask, the deposited films being superposed on the end face 24 of the electrode carrier.

The other steps of the manufacturing method are known, and will not be described in this patent application.

Advantageously, the sputtering is carried out at the same time on one of the main faces of the electrode carrier and on the end face.

Advantageously, the film deposited on the upper face of the electrode carrier meets the electrode etching requirements; the same method is used on the lower face of the electrode carrier, the two deposited films naturally joining by overlap on the end face.

Advantageously, the sputtering makes it possible to separate the soldering requirements for the upper face from the etching requirements for the lower face.

Advantageously, the sputtering enables thin electrodes to be produced that have no mechanical effect on the electrode carrier and therefore on the air gap.

Advantageously, the two electrode deposition steps and the ion etching step may be carried out in the same chamber.

Advantageously, the electrode carrier is no longer penetrated by bushings so that it is simpler to produce and to clean.

Advantageously, it is no longer necessary for the bushings to be electrically connected to the electrodes.

These advantages make it possible to reduce the production costs, to increase the yield and the performance of the gyroscopes.

Advantageously, the electrode/rod electrical connection via the end face obviates the drawbacks:

of vias in the electrode carrier (small-diameter drilling, precise positioning);

of bushings (thermal expansion causing fracture);

of adhesives (outgassing limiting the quality and duration of the vacuum, flexibility and approximate definition of the edges degrading the stability of the frequency plane, thermal expansion causing fractures, and temperature instability of the air gap).

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A gyroscopic sensor comprising:
    a sensitive element designed to vibrate;
    an electrode carrier and a plurality of electrodes, wherein the electrode carrier is capable of carrying electrodes for exciting the sensitive element and wherein the electrodes detect the vibration of the sensitive element;
    a plurality of support rods designed to support the electrode carrier, the support rods have at least one bulged end; and
    wherein the electrode carrier comprises a first main face facing the sensitive element, an end face and a second main face opposite the first main face; the electrodes for exciting and the electrodes for detecting extend both over the first main face, over the end face and over the second main face; the bulged end being fastened to at least one part of the electrodes for exciting and the electrodes for detecting; said part of said electrodes extending over the second main face.

2. The gyroscopic sensor according to claim 1, in which the bulged end rests on the electrode carrier.

3. The gyroscopic sensor according to claim 1, in which each support rod is all in one piece.

4. The gyroscopic sensor according to claim 1, in which each support rod is non intrusive with respect to the electrode carrier.

5. The gyroscopic sensor according to claim 1, in which each bulged end comprises a flat end face.

6. The gyroscopic sensor according to claim 1, which includes a base capable of supporting the support rods, and in which a bulged end is fastened to the base.

7. The gyroscopic sensor according to claim 6, in which the support rods is mounted in spacer between the electrode carrier and the base.

8. The gyroscopic sensor according to claim 1, in which each support rod is non intrusive with respect to the base.

9. A method for manufacturing a gyroscopic sensor comprising: a sensitive element designed to vibrate; an electrode carrier capable of carrying electrodes for exciting the sensitive element and electrodes for detecting the vibration of the sensitive element; and support rods designed to support the electrode carrier, said method includes a step of manufacturing support rods having at least one bulged end, wherein the electrode carrier of the gyroscopic sensor having a first main face facing the sensitive element, an end face and a second main face opposite the first main face, the method including a step of depositing a portion of an electrode by sputtering on the first main face and on the end face through a slotted mask and depositing a complementary portion of said electrode by sputtering on the second main face and on the end face through another slotted mask, the deposited films being superposed on the end face of the electrode carrier.

10. A gyroscopic sensor comprising:

a sensitive element designed to vibrate;

an electrode carrier and a plurality of electrodes, wherein the electrode carrier is capable of carrying electrodes for exciting the sensitive element and wherein the electrodes detect the vibration of the sensitive element;

a plurality of support rods designed to support the electrode carrier, wherein the support rods have at least one bulged end, and wherein the electrode carrier has a first main face that faces the sensitive element and a second main face, opposite the first main face, and in which the electrodes extend in a continuous manner over the first main face, the end face and the second main face of the electrode carrier.

* * * * *